United States Patent
Reuman

(10) Patent No.: US 6,690,488 B1
(45) Date of Patent: Feb. 10, 2004

(54) METHOD AND APPARATUS FOR ESTIMATING THE SPATIAL FREQUENCY RESPONSE OF A DIGITAL IMAGE ACQUISITION SYSTEM FROM THE IMAGES IT PRODUCES

(75) Inventor: Steven R. Reuman, Acton, MA (US)

(73) Assignee: Polaroid Corporation, Waltham, MA (US)

( * ) Notice: Subject to any disclaimer, the term of this patent is extended or adjusted under 35 U.S.C. 154(b) by 0 days.

(21) Appl. No.: 09/409,459

(22) Filed: Sep. 30, 1999

(51) Int. Cl.[7] ............................................. G06F 15/00
(52) U.S. Cl. ..................................... 358/1.9; 358/1.18
(58) Field of Search ................................ 358/1.9, 1.16, 358/1.17, 1.18, 401, 434, 435, 436; 382/280, 200.65

(56) References Cited

U.S. PATENT DOCUMENTS

| | | | | |
|---|---|---|---|---|
| 5,450,216 A | * | 9/1995 | Kasson | 358/518 |
| 5,561,611 A | * | 10/1996 | Avinash | 702/111 |
| 5,600,574 A | * | 2/1997 | Reitan | 702/185 |
| 5,694,484 A | * | 12/1997 | Cottrell et al. | 382/167 |
| 5,696,850 A | * | 12/1997 | Parulski et al. | 382/261 |
| 5,774,599 A | * | 6/1998 | Muka et al. | 382/254 |
| 5,835,627 A | * | 11/1998 | Higgins et al. | 382/167 |
| 5,946,413 A | * | 8/1999 | Shibata et al. | 382/174 |
| 6,014,468 A | * | 1/2000 | McCarthy et al. | 382/254 |
| 6,035,065 A | * | 3/2000 | Kobayashi et al. | 382/201 |
| 6,069,982 A | * | 5/2000 | Reuman | 382/275 |
| 6,163,389 A | * | 12/2000 | Buhr et al. | 358/527 |

FOREIGN PATENT DOCUMENTS

| | | | | |
|---|---|---|---|---|
| WO | WO 98/10376 | * | 3/1998 | G06T/1/00 |
| WO | WO98/10376 | | 3/1998 | G06T/1/100 |
| WO | WO99/33023 | | 7/1999 | G06T/5/00 |
| WO | WO 99/33023 | * | 7/1999 | G06T/5/00 |

OTHER PUBLICATIONS

PCT International Search Report for PCT/US00/26868 (Forms PCT/ISA/210 and 220) (mailed Nov. 1, 2001).*

(List continued on next page.)

*Primary Examiner*—Mark Wallerson

(57) ABSTRACT

Estimating the spatial frequency response (SFR) of an image acquisition system or device from its output images is accomplished by a image processing system and method thereof even when the original scene content cannot be carefully controlled as in the laboratory method. The image processing system methodology assumes that the scene contains specified reference signals (e.g., step edges), but that the reference signals' location, orientation, contrast, mean gray level, and spatial extent in the corresponding digitized image(s) are unknown. Reference signal responses are searched for and extracted using a paradigm, culminating in a set of candidate responses which survive all the tests by scoring highest on the goodness metrics. These surviving candidate responses are each fit, alone or in groups, to ideal responses that would occur if the given reference signal was passed through likely system models. The SFR of the system which best fits each available candidate response is an estimate of the input imaging device SFR. Each candidate response therefore has three computed quantities associated with it: 1) the SFR corresponding to the system producing the best fit, 2) a goodness-of-fit value from the fitting procedure, and 3) the goodness score achieved by the candidate during the initial identification and pruning procedure. A centroid in this 3D parameter space, weighted heavily toward candidates with high integrated SFR, is used to choose the final SFR system estimate. Step edges may be used as the reference signal, but the system is not limited thereto.

30 Claims, 8 Drawing Sheets

OTHER PUBLICATIONS

A.P. Tzannes et al.., "Measurement of the Modulation Transfer Function of Infrared Cameras", Optical Engineering 34 (6), 1808 1817 (Jun. 1995).*

S.E. Reichenbach et al., "Characterizing digital image acquisition devices", Optical Engineering 30 (2), 170–177 (Feb. 199.*

Thomas A. Germer and Clara C. Asmail, "Spatial Frequency Response Function Estimation Program", Optical Technology Division—National Institute of Standards and Technology, pp. 1–16.*

PCT International Search Report for PCT/US00/26868 (Forms PCT/ISA/210 and 220) (mailed Nov. 1, 2001).

A.P. Tzannes et al., "Measurement of The Modulation Transfer Function Of Infrared Cameras", Optical Engineering 34(6), 1808–1817 (Jun. 1995).

S.E. Reichenbach et al., "Characterizing digital image acquisition devices", Optical Engineering 30(2), 170–177 (Feb. 1991).

* cited by examiner

METHOD AND APPARATUS FOR ESTIMATING THE SPATIAL FREQUENCY RESPONSE OF A DIGITAL IMAGE ACQUISITION SYSTEM FROM THE IMAGES IT PRODUCES

TECHNICAL FIELD OF THE INVENTION

This invention relates to image processing and, more particularly, to a method and apparatus for determining the spatial frequency response characteristics of a digital image acquisition system or device such as an electronic camera or scanner, when the input from the original scene content is uncontrolled, except that it contains reference signals of a given class (e.g., step edges) whose location and exact spatial properties are unknown.

BACKGROUND OF THE INVENTION

Conventionally in the laboratory, the spatial frequency response (SFR) of a (linear) image acquisition system is defined as SFR(f)=O(f)/I(f), where O is output, I is input, and f is spatial frequency. SFR is measured by passing a known "reference signal" through the system and calculating the ratio at each spatial frequency of concern. Typically, the known reference signal takes the form of a calibrated physical target containing step edges, sine waves or other known waveforms. The target is imaged through the system to digital form, a region of interest containing only the reference signal is extracted by a human, and finally the extracted digital region of interest is passed through a specially designed SFR estimation program which precisely locates, registers, and averages together multiple reference signal responses, eventually transforming to the frequency domain to obtain SFR(f). A method and a computer program intended for measuring the modulation transfer function (MTF) relating to electronic imaging for cameras and scanners are standardized and defined in the following International Standards Organization (ISO) documents: 1) ISO# 12233, WG18, Work Item 188, entitled *Photography— Electronic Still Picture Cameras*; and 2) ISO# 16067-1, WG18, Work Item 214, entitled *Photography—Electronic Scanner for Photographic Images*. The aforementioned ISO documents are incorporated by reference herein in their entirety for supplemental background information which is non-essential but helpful in appreciating the applications of the present invention.

While the aforementioned laboratory methodology may be fairly accurate for measuring SFR, they have some of the following shortcomings. First, the conventional methodologies are time consuming, expensive, and require laboratory level control over the content of the input scene. Second, the conventional methodologies do not take into account any differences in system behavior accruing between characterization time and later use of the system. For instance, SFR may change due to device age, temperature, physical abuse, accidental mis-focus, internally variable system parameters. etc. Third, the conventional methodologies cannot address local (intra-image) de-focussing effects such as those due to depth-of-field. Fourth, the measured SFRs of the conventional methodologies must be widely available in a standard format analogous to the ICC color profile format, in order to be useful to downstream image processing operations.

A "spatial profile" format is disclosed in U.S. patent application Ser. No. 08/709,487 filed Sep. 6, 1996 by Hultgren et al. and is hereby incorporated by reference herein in its entirety for background information. A device color profile is standardized and defined as "a digital representation of the relation between device coordinates and a device-independent specification of color" in the International Color Consortium (ICC) Profile Format Specification, Version ICC. 1: 1998-08 incorporated by reference herein in its entirety for supplemental background information which is non-essential but helpful in appreciating the applications of the present invention.

In practice, carefully measured SFR's in a standard spatial profile format are often not available. New digital cameras and scanners are introduced every month, and there may simply be too many to accurately characterize. Images needing enhancement may be received from the World Wide Web (WWW) and/or the Internet, and the system which produced them can be entirely unknown, making SFR calculation by the conventional methods impossible.

There is therefore a need in the art for an effective apparatus and method thereof for estimating the SFR characteristics of an image acquisition system, such as a scanner or camera, from its output images, when the original scene content cannot be carefully controlled as in the laboratory or conventional methods. Particular needs remain for an apparatus and a method for estimating SFR characteristics that can provide: an efficient and cost-effective method; the capability to take into account changes that accrue with later use of the image acquisition system; the capability to address depth-of-field; and the ability to avoid the constraints associated with requiring SFR characteristics that are widely available in some standard "spatial profile" format, in order to be usefull to downstream image processing operations.

By way of background, a disclosure directed towards a digital image processing system for estimating the frequency dependence and gray-level dependence of noise introduced by an image source device, and more particularly, for generating a spatial device profile describing the noise introduced by the source device is disclosed in U.S. patent application Ser. No. 08/996,810 by Reuman is hereby incorporated by reference herein in its entirety as background information.

SUMMARY OF THE INVENTION

The present invention is directed generally toward an image processing system device and method thereof for estimating the SFR of an image acquisition system or device from its output images, when the original scene content cannot be carefully controlled as in the laboratory method. By practicing the disclosed invention, the skilled practitioner can automatically or semi-automatically determine the SFR of an image acquisition or device, assuming that the scene contains specified reference signals (e.g., step edges) while the reference signals' location, orientation, contrast, mean gray level, and spatial extent in the corresponding digitized image(s) may be unknown.

In one aspect, the present invention features a method of estimating spatial frequency response (SFR) of a digital image acquisition system or device from the images that the system or device produces from input of an original scene, wherein the estimating method comprising the following steps: gathering, from the acquired image or images, data related to the SFR of the digital image acquisition system or device; computing, from the gathered data, a collection of one or more SFR estimates which describe the gathered data; and generating, from the collection of SFR estimates and the gathered data, a single overall estimate of the SFR of the digital image acquisition system or device. In some embodiments, the present invention comprises a semi-automated step that includes gathering additional information, from a source exclusive from the gathered data from the acquired image or images, wherein the additional information is related to the SFR of the digital image acquisition system or device.

In a second aspect, the invention features an image processing system for estimating spatial frequency response (SFR) of a digital image acquisition system or device from the images that the digital acquisition system or device produces from input of an original scene, the image processing system comprising: a means for gathering, from the acquired image or images, data related to the SFR of the digital image acquisition system or device; a means for computing, from the gathered data, a collection of one or more SFR estimates which describe the gathered data; and a means for generating, from the collection of SFR estimates and the gathered data, a single overall estimate of the SFR of the digital image acquisition system or device. In an alternative embodiment, the present invention comprises a semi-automated means that includes a means for gathering additional information, from a source exclusive from the gathered data from the acquired image or images, wherein the additional information is related to the SFR of the digital image acquisition system or device.

An advantage of the present invention is that it can be fully automatic—no human intervention is necessary. It can therefore be put to use when human involvement is too costly for whatever reason. A fully automatic approach may be augmented if the internal system models are inconsistent with the actual behavior of the physical systems in question. In this case, a semi-automatic system is required whereby additional partial system knowledge such as system type is added by querying the user, the image header, or other available information.

Furthermore an advantage of the present invention is that it provides an effective apparatus and method thereof for estimating the SFR characteristics of an image acquisition system, such as a scanner or camera, from its output images, when the original scene content cannot be carefully controlled as in the laboratory method.

Moreover, the present invention SFR estimation apparatus and method thereof provide an efficient and cost-effective method for estimating the SFR of an image acquisition system or device.

Further yet, the present invention SFR estimation apparatus and method thereof provide the capability to take into account changes to SFR that accrue during use of the image acquisition system.

Still further, the present invention SFR estimation apparatus and method thereof provide the capability to address intra-image differences in SFR due to depth of field related focus effects.

Finally, the present invention SFR estimation apparatus and method thereof avoid the need for having standard SFR information widely available in some standard "spatial profile" format.

These and other objects, along with advantages and features of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings, in which.

DETAILED DESCRIPTION OF THE PREFERRED EMBODIMENTS

The present invention is directed generally towards an image processing system device and method thereof for estimating the SFR of an image acquisition system or device from its output images, when the original scene content cannot be carefully controlled as in the laboratory method or the like. The present invention methodology assumes that the scene contains specified reference signals (e.g., step edges), but that the reference signals' location, orientation, contrast, mean gray level, and spatial extent in the corresponding digitized image(s) are unknown. Reference signal responses are searched for and extracted using a paradigm [i.e., gather data→rank and sort with goodness metric→prune→update goodness metric], culminating in a set of candidate responses which survive all the tests by scoring highest on the goodness metrics. These surviving candidate responses are each fit, alone or in groups, to ideal responses that would occur if the given reference signal was passed through likely system models. The SFR of the system which best fits each available candidate response is an estimate of the input imaging device SFR. Each candidate response therefore has three computed quantities associated with it: 1) the SFR corresponding to the system producing the best fit, 2) a goodness-of-fit value from the fitting procedure, and 3) the goodness score achieved by the candidate during the initial identification and pruning procedure. A centroid in this 3D parameter space, weighted heavily toward candidates with high integrated SFR, is used to choose the final SFR system estimate. In a preferred embodiment, step edges are used as the reference signal, but not limited thereto. For instance, the reference signals may also be lines, points, corners, or curves.

Figure 1:
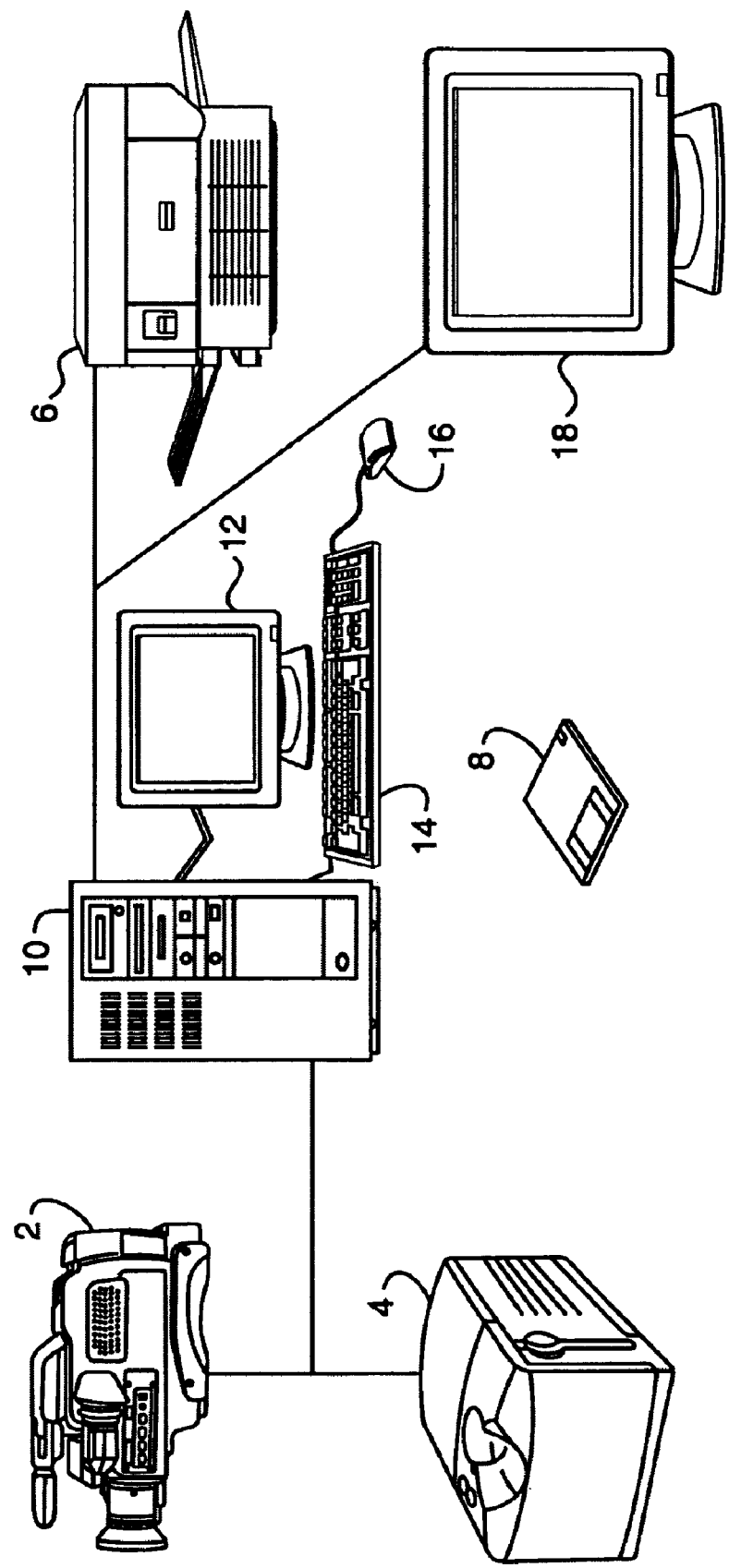
FIG. 1 is a preferred embodiment of an electronic imaging system according to the present invention.

FIG. 1 illustrates the electronic image processing system according to the present invention where an image of a subject/original scene (not shown) is acquired by an image acquisition device such as the electronic camera 2 or the image scanner 4. The computer 10 receives an electronic representation of the image from the image acquisition device and thereafter processes the image electronically to provide any number of known image processing functions such as resizing, sharpening, noise removal, reflection or edge detection. The processed image can be stored in a diskette 8, displayed on an user monitor 12, printed on a printer 6, or transmitted to a remote monitor 18. Operator interaction with the system is facilitated by use of the keyboard 14 or the mouse 16. Of course, the components shown in FIG. 1 are merely exemplary rather than all inclusive of the many equivalent devices known by those skilled in the art. For instance, the image acquisition device includes any device for electronically acquiring an image such as an electronic camera, a scanner, a camcorder, a charge coupled device, a charge injected device, etc. It is noteworthy that the image processing need not necessarily occur solely in the computer 10. Indeed, various phases or aspects of the image processing could occur in any one of the image acquisition devices and/or input/output devices.

Although the electronic image processing system has been indicated as comprising elements of a general-purpose stored-program computer 10, it will be apparent to those skilled in the art that the image processing system may alternatively include special-purpose hardware and/or program components, or a combination of a computer 10 with special-purpose hardware and/or program components.

Computer useable medium having computer readable code means embedded or encoded thereon is also contemplated. In such an article of manufacture, the computer readable program code will comprise various means for implementing the method disclosed herein. By way of example, and not limitation, suitable computer useable media include magnetic disks (both fixed and removable), optical disks, compact disks, magnetic tape, volatile memory, nonvolatile memory, and the like. In these articles of manufacture the term "embedded thereon" should be read to include the various methods of encoding computer readable program code means so they are contained on or in the computer usable media.

In addition, another application of the present invention is using the image processing system as part of a networked image acquisition and rendering apparatus (e.g. internet, intranet, World Wide Web) which can process the signal data with its acquisition apparatus at a source location and/or with its rendering apparatus at a remote destination location. The application of a networked imaging system is disclosed in U.S. Pat. No. 5,851,186 to Wood et al., and is herein incorporated by reference.

Image processing can occur in either the spatial domain or the frequency domain. An image is said to reside in the spatial domain when the values of the parameters used to describe it, such as brightness, have a direct correspondence with spatial location. In the frequency domain, the image of the spatial domain may be represented by a series of frequency components in the form of trigonometric functions which, when summed for each image data point, i.e. pixel, yield the value of the parameter used to characterize the image for that image data point in the spatial domain, and such a representation may be extended to cover all image data points of an image.

In the spatial domain, original image data may be conveniently represented as image data points in a first spatial matrix designated s(j,i) for the two-dimensional case where the lower case, s, designates the spatial domain, i is the index of rows and j is the index of columns. In the frequency domain, matrices can also be used to mathematically describe an image as a set of the transform coefficients (also referred to as frequency coefficients) which represent frequency data in a transform matrix conventionally designated S(v,u) where the upper case, S, designates the frequency domain, u is the number of rows and v is the number of columns.

Spatial image data points may be transformed to frequency space using transformations such as Fourier transforms or discrete even cosine transforms (i.e. DECTs further abbreviated as DCTs).

Figure 2:
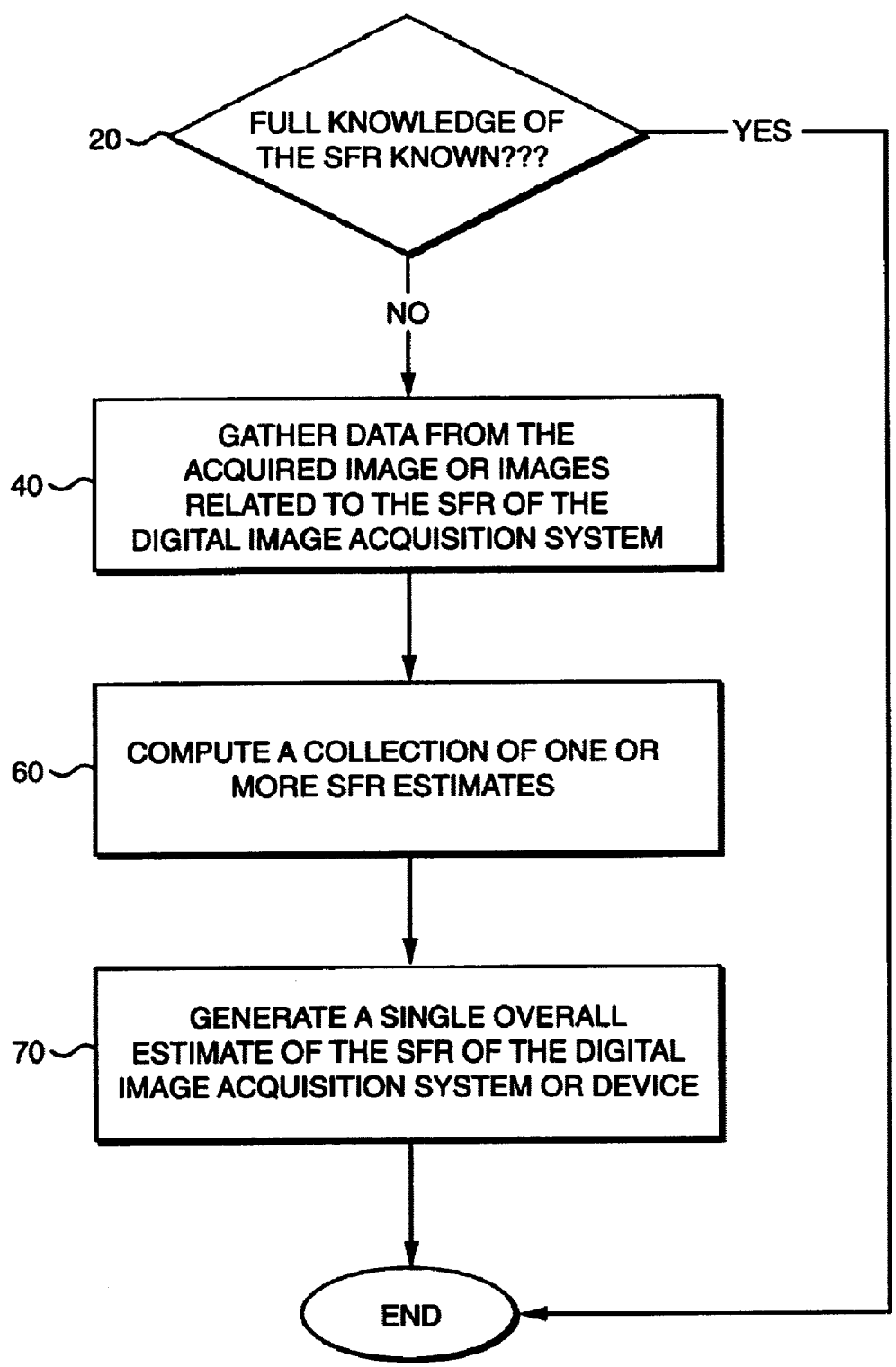
FIG. 2 illustrates a flowchart of a preferred embodiment of the image processing system and method thereof for automatically estimating a single overall SFR of an image acquisition system/device from its output images.

FIG. 2 illustrates a flowchart of a preferred embodiment of the image processing system and method thereof for automatically estimating a single overall SFR of an image acquisition system/device from its output images, when the original scene content cannot be carefully controlled as in the laboratory method or the like. Box 20 queries the user whether full knowledge of the SFR is known. If full knowledge of the SFR is known then the process ends. However, if any information of the SFR is incomplete or missing then the image processing system gathers, from the acquired image or images, data related to the SFR of the digital image acquisition system or device as in box 40. The gathered data typically relates to finding system responses to step edges, lines, points, and/or corners in the original scene. Next, the image processing system computes, from the gathered data, a collection of one or more SFR estimates which describe the gathered data as in box 60. Finally, the image processing system generates, from the collection of SFR estimates and the gathered data, a single overall estimate of the SFR of the digital image acquisition system or device as in box 70.

Figure 3:
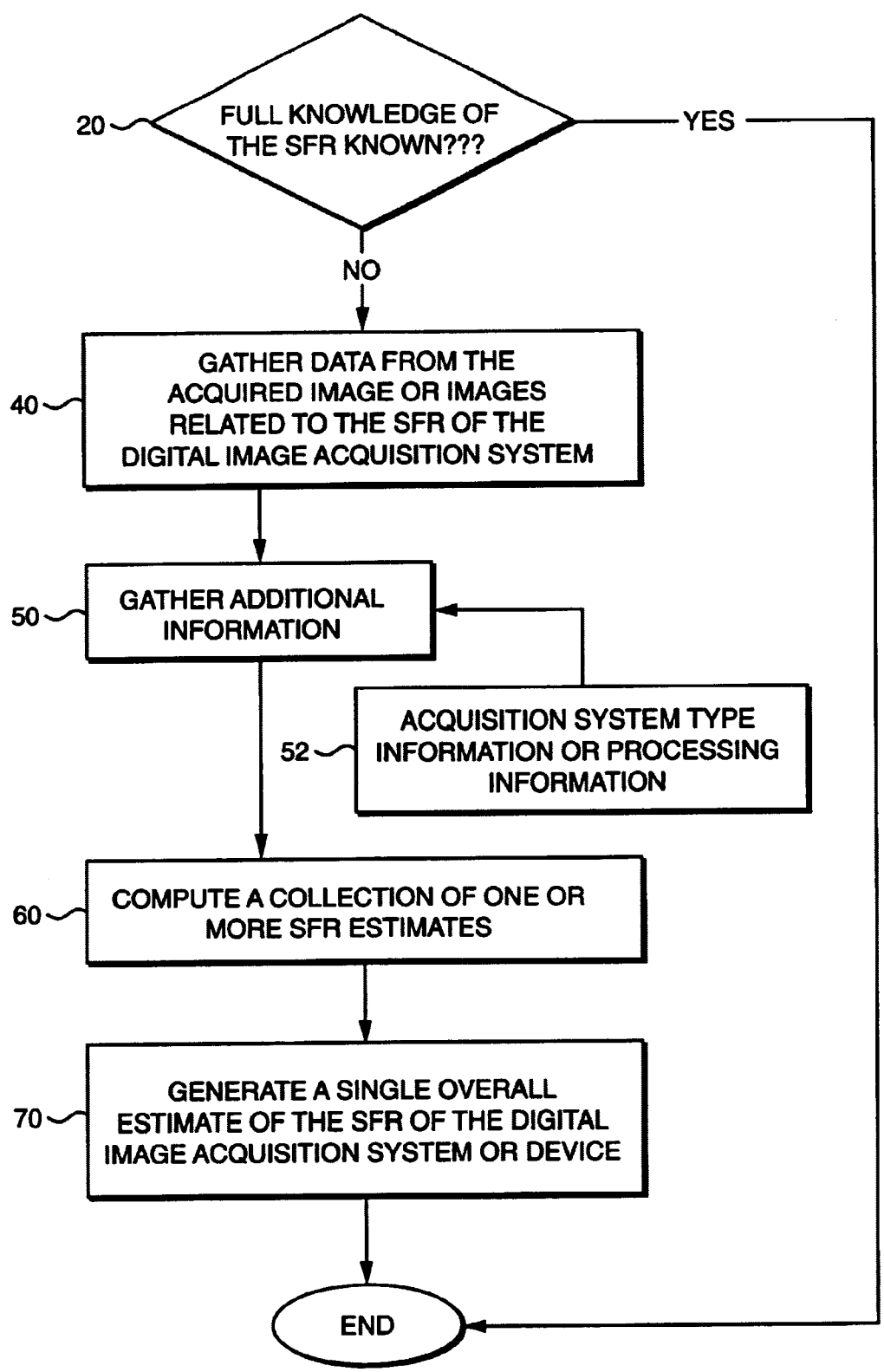
FIG. 3 illustrates a flowchart of a preferred embodiment of the image processing system and method thereof for semi-automatically estimating a single overall SFR of an image acquisition system/device from its output images.

FIG. 3 illustrates a flowchart of a preferred embodiment of the image processing system and method thereof for semi-automatically estimating a single overall SFR of an image acquisition system/device from its output images, when the original scene content cannot be carefully controlled as in the laboratory method or the like. In addition to the flowchart illustrated in FIG. 2, the image processing system gathers additional information, from a source exclusive from the gathered data from the acquired image or images, wherein the additional information is related to the SFR of the digital image acquisition system or device as in box 50. As one skilled in the art would appreciate, the additional information is related to, but not limited thereto, acquisition system type information or information relating to compression, decompression, sharpening, focusing, blurring, interpolation, resolution, dots-per-inch scanning, and/or color profiles.

Figure 4:
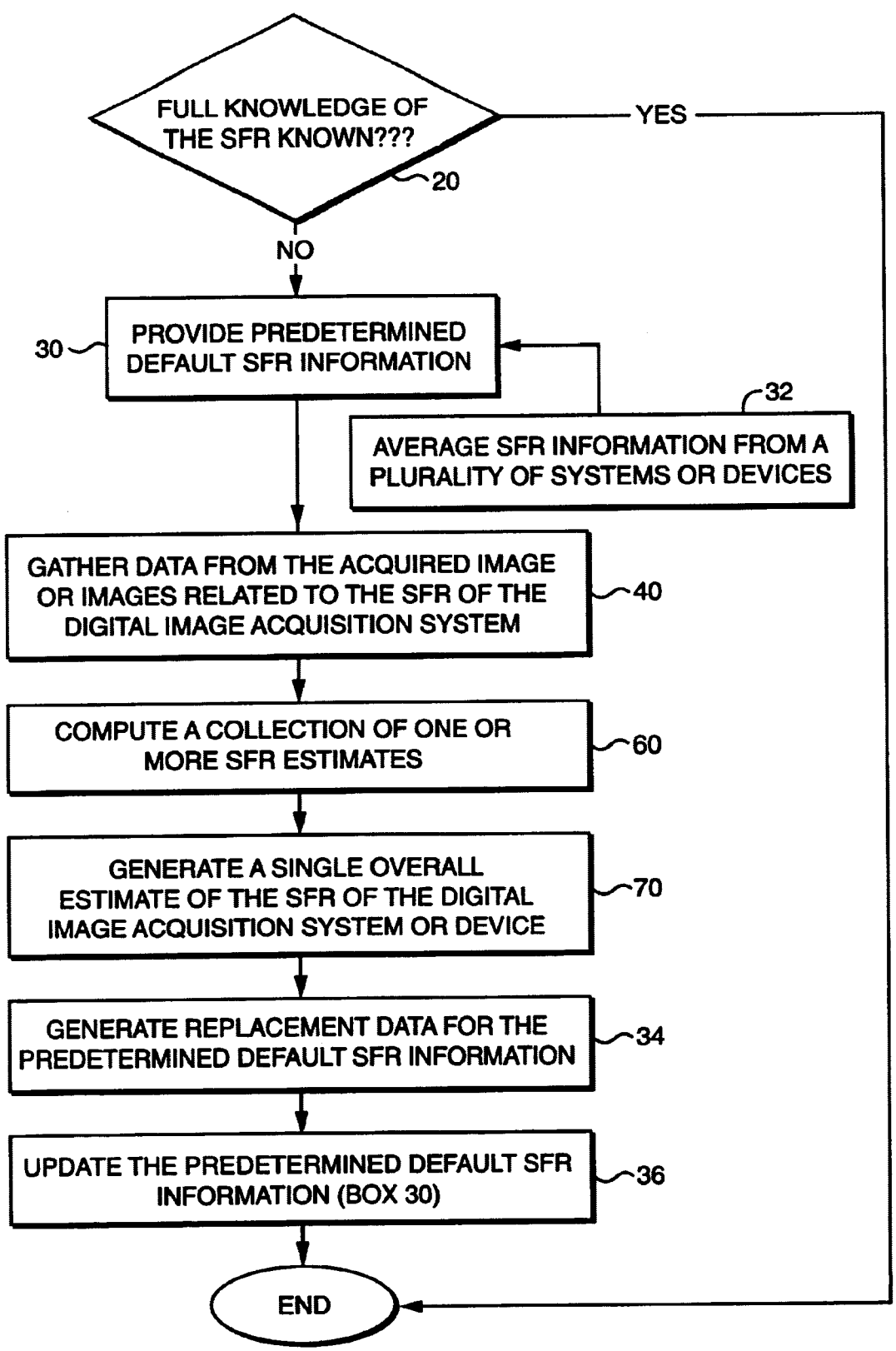
FIG. 4 is flowchart that further provides a predetermined default SFR information so as to improve the performance of the method as represented in FIG. 2.

FIG. 4 illustrates a flowchart of a preferred embodiment of the image processing system and method thereof for automatically estimating a single overall SFR of an image acquisition system/device from its output images and providing a predetermined default SFR information so as to improve the method as represented in FIG. 2. In addition to the flowchart illustrated in FIG. 2, the image processing system provides predetermined default SFR information about the digital image acquisition system or device as in box 30. Initially, the predetermined default SFR originates by averaging SFR information from a plurality of image acquisition systems or devices as in box 32. Moreover, after steps 40, 60, and 70, the image processing system generates, from the gathered data related to the SFR (box 40) and the single overall estimate of the SFR (box 60), replacement data for the predetermined default SFR information about the digital image acquisition system or device, as in box 34. Thereafter, the image processing system updates the predetermined default SFR information with the replacement data as in box 36. The updating of the predetermined default SFR is performed iteratively whereby the updates are formed by a previous instantiation of the replacement data for the predetermined defaults SFR.

Figure 5:
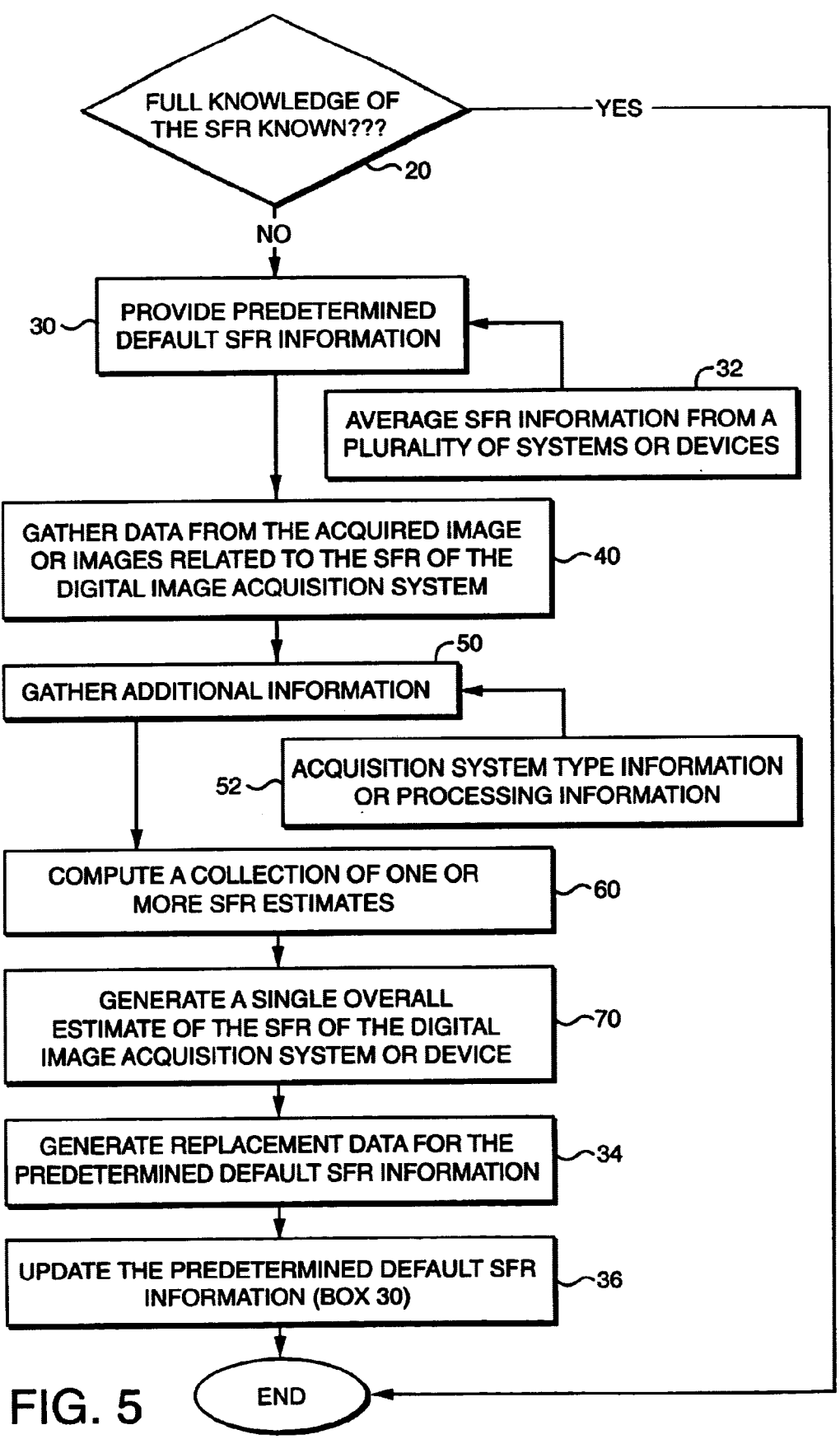
FIG. 5 is flowchart that further provides a predetermined default SFR information so as to improve the performance of the method as represented in FIG. 3.

FIG. 5 illustrates a flowchart of a preferred embodiment of the image processing system and method thereof for semi-automatically estimating a single overall SFR of an image acquisition system/device from its output images and providing a predetermined default SFR information so as to improve the method as represented in FIG. 3. In addition to the flowchart illustrated in FIG. 3, the image processing system provides predetermined default SFR information about the digital image acquisition system or device as in box 30. Initially, the predetermined default SFR originates by averaging SFR information from a plurality of image acquisition systems or devices as in box 32. Moreover, after steps 40, 50, 60, and 70, the image processing system generates, from the gathered data related to the SFR (box 40), the additional information related to the SFR (Box 50) and the single overall estimate of the SFR (box 60), replacement data for the predetermined default SFR information about the digital image acquisition system or device, as in box 34. Thereafter, the image processing system updates the predetermined default SFR information with the replacement data as in box 36. The updating of the predetermined default SFR is performed iteratively whereby the updates are formed by a previous instantiation of the replacement data for the predetermined defaults SFR.

Figure 6:
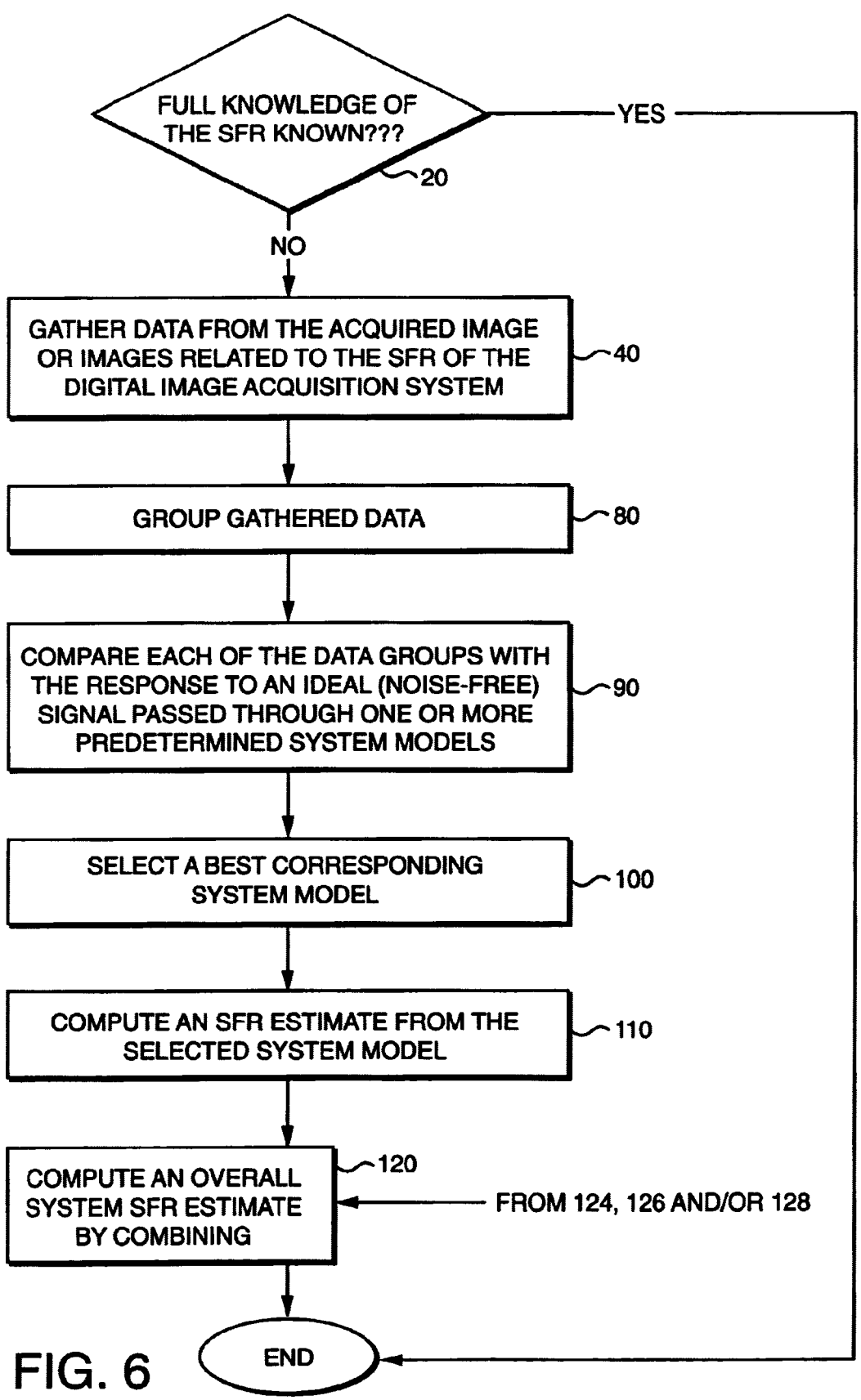
FIG. 6 illustrates a flowchart of a preferred embodiment of the image processing system and method thereof for automatically estimating a group SFR and an overall system SFR of an image acquisition system/device.

FIG. 6 illustrates a flowchart of a preferred embodiment of the image processing system and method thereof for automatically estimating a group SFR and an overall system SFR of an image acquisition system/device from its output images. In addition to the flowchart illustrated in FIG. 2, the image processing system groups the gathered data (box 40) into one or more data groups as in box 80. The image processing system compares each of the data groups with the response to an ideal (noise-free) signal passed through one or more predetermined system models as in box 90. Some examples of predetermined system models are represented by camera or scanner models. Next, the image processing system selects, box 100, a system model for each of the data groups that best corresponds with each of the data groups. Thereafter, the processing system computes a group SFR estimate, box 110, from the selected system model, for each of the data groups. Referring to box 120, the processing system computes an overall system SFR estimate by combining the SFR estimates for each of the groups.

Figure 7:
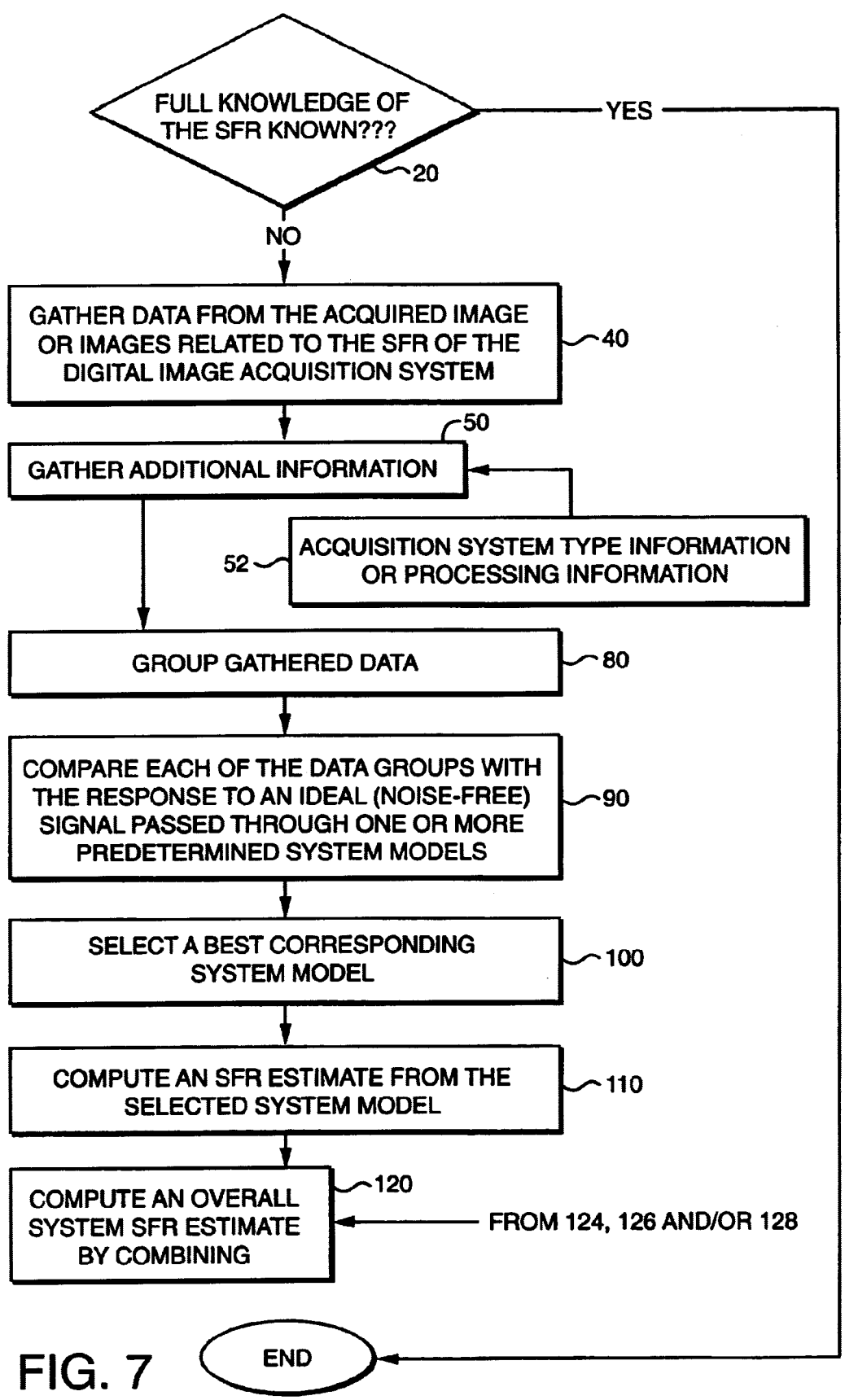
FIG. 7 illustrates a flowchart of a preferred embodiment of the image processing system and method thereof for semi-automatically estimating a group SFR and an overall system SFR of an image acquisition system/device.

FIG. 7 illustrates a flowchart of a preferred embodiment of the image processing system and method thereof for semi-automatically estimating a group SFR and an overall system SFR of an image acquisition system device from its output images. In addition to the flowchart illustrated in FIG. 3, the image processing system groups the gathered data (box 40) into one or more data groups as in box 80. The image processing system compares each of the data groups with the response to an ideal (noise-free) signal passed through one or more predetermined system models as in box 90. Some examples of predetermined system models are represented by camera or scanner models. Next, the image processing system selects, box 100, a system model for each of the data groups that best corresponds with each of the data groups. Thereafter, the processing system computes a group SFR estimate, box 110, from the selected system model, for each of the data groups. Referring to box 120, the processing system computes an overall system SFR estimate by combining the SFR estimates for each of the groups.

Figure 8:
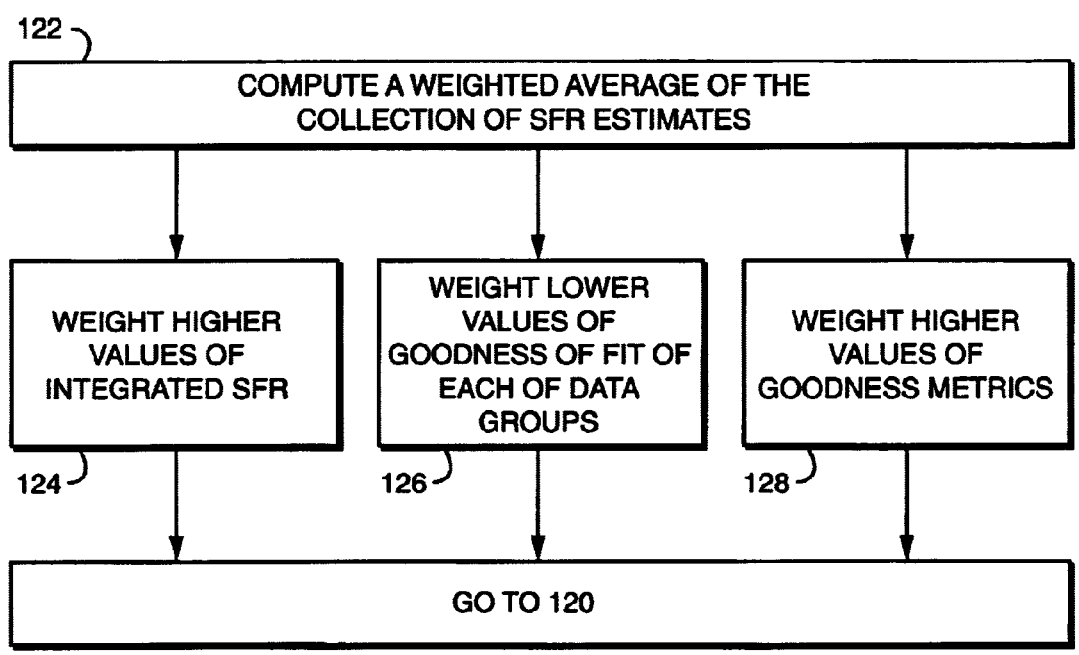
FIG. 8 illustrates a flowchart for combining the collection of SFR estimates to compute, by weighting, the overall SFR estimate for either of the automatic and/or semi-automatic SFR estimation system.

FIG. 8 illustrates a flowchart of a preferred embodiment of the image processing system and method thereof for combining the collection of SFR estimates to compute the overall SFR (box 120) estimate for either of the automatic and/or semi-automatic SFR estimation system. The overall system SFR is computed by a weighted average, box 122, of the collection of SFR estimates. The weights of the weighted average are derived from an integrated SFR, goodness metrics associated with the gathered data, and a goodness of fit of each of the data groups associated with the SFR estimates. As shown in boxes 124, 126, and 128, respectively, the weighted average is derived by weighting higher values of the integrated SFR more heavily, relative to lower values of the integrated SFR; weighting lower values of the goodness of fit (i.e., better fit is lower $\chi^2$) of each of the data groups more heavily, relative to higher values of the goodness of fit; and/or weighting higher values of the goodness metrics more heavily, relative to lower values of the goodness metrics.

As one skilled in the art would appreciate, any of the aforementioned SFR estimates are capable of being represented as a Fourier domain value occurring at predetermined spatial frequencies.

What follows is a detailed algorithm, having ten steps, for estimating the SFR of a digital image acquisition system/device from one or more digital images produced by the digital image acquisition system/device. Without loss of generality, the method refers only to a single input image, but can be applied to N images received from the same system. The method is comprised of the following steps:

1. Smooth the input image I by convolving with a gaussian G, and then numerically differentiate in x and y to obtain $P=(P_x,P_y)$.

2. Apply a prior art edge detection algorithm to P, obtaining a set of positions likely to correspond to edge locations. In the preferred embodiment, the Canny edge detector (J. Canny, A Computational Approach to Edge Detection. IEEE PAMI 8(6), 679–698, November, 1986, incorporated by reference herein) is used. The result of this edge detection procedure is an image E consisting of ones and zeros, where the ones mark edge points.

3. For each set C of connected edge points in E, measure its length L, total gradient magnitude g and total curvature c. Determine the N sets (larger N will take longer to analyze) with the largest $M=L*g/c$. Compute a new edge image E' by pruning edge curves from E so that the image contains only the chosen N sets.

4. Compute the gradient direction and take one-dimensional scans s of length H in the direction of the gradient perpendicularly to, or across, all edge locations marked in E' using the data in image P.

5. Apply a more restrictive edge test to each scan s in E'. The edge test used is a T-test which compares the two halves of the scan s on either side of the candidate edge, excluding q pixels directly adjacent to the edge itself. Let $n_1=H/2-q$ data points of s on one side of the edge position be set 1 and $n_2=n_1$ on the other side be set 2, where $x_1$ are the pixels of set 1 and $x_2$ are the pixels of set 2. Then $$T = \frac{|\mu_1 - \mu_2|}{\sqrt{\frac{\sigma_1^2 * (n_1 - 1) + \sigma_2^2 * (n_2 - 1)}{n_1 + n_2 - 2}} * \left(\frac{1}{n_1} + \frac{1}{n_2}\right)}$$

$$\mu_1 = \frac{\sum w(i) * x_1(i)}{\sum w(i)}$$

$$\mu_2 = \frac{\sum w(i) * x_2(i)}{\sum w(i)}$$

$w(i)=0$ if $i \leq q$; 1 otherwise

The scan is not used if any of the following hold $\sigma_1^2 > \sigma_n^2$ $\sigma_2^2 > \sigma_n^2$ $k \in (k_{min}, k_{max})$ $T<5$ where $\sigma_n^2$ is a pre-determined estimate of noise power at $\mu=(\mu_1+\mu_2)/2$ and $k=|\mu_1-\mu_2|/(\mu_1+\mu_2)$. If there are too few acceptable scans, the image does not contain enough good edges and the algorithm stops.

6. For each scan s which survives the above test, let F=T*k*g*R, where R is the percentage of acceptable scans in the curve. Sort the surviving scans with respect to this goodness metric F.
7. Convert the selected scans back through the system model, to the color space occurring directly after sharpening or blurring took place.
8. Differentiate each scan s numerically to produce s'. Apply a Welch window W to s', i.e., compute s'w(i)= s'(i) (1−((i−H/2)/(H/2)). Take the Fourier amplitude spectrum of each resulting s'w.
9. Fit each amplitude spectrum with a reference spectrum, that is, the spectrum of the (differentiated, noise-free) response of a given system model to an ideal input step edge.

For cameras, the preferred embodiment system model consists of gaussian smoothing and difference-of-gaussians sharpening applied in linear (exposure) space, followed by application of a gamma correction (which may be 1.0). Difference-of-gaussians sharpening involves convolution with a kernel formed by the super-position of a positive gaussian of width $\sigma_1$ and a negative gaussian of width $\sigma_2$ with $\sigma_2 > \sigma_1$.

For scanners, the preferred embodiment system model is (a) blur and sharpen in exposure space
(b) linear exposure→log exposure
(c) log exposure→print density (H&D curve)
(d) print density→print percent reflectance (R=$10^D$)
(e) blur due to scanner optics
(f) print percent reflectance→scanner digits (A-to-D)
(g) scanner software imposed gamma One skilled in the art would appreciate that other generic system models can of course be substituted or added to those above.

The camera system model is used as follows to evaluate the likelihood that the observed scan amplitude spectrum arose from a scene step edge passed through a camera. A non-linear least squares fitting routine is used to fit the amplitude spectrum data to the following function SFR(f):

$u_0 = \sin(2\pi\alpha_0) * c_{10} + c_{11}$ $u_1 = \sin(2\pi\alpha_1) * c_{20} + c_{21}$ $u_2 = \sin(2\pi\alpha_2) * c_{30} + c_{31}$ $u_3 = \sin(2\pi\alpha_3) * c_{40} + c_{41}$ $g_0(f) = e^{-05*\left(\frac{f}{u_0}\right)^2}$ $g_1(f) = e^{-05*\left(\frac{f}{u_1}\right)^2}$ $g_2(f) = e^{-05/u_2^2\left(\frac{f}{u_1}\right)^2}$ $SFR_i(f) = g_0(f) + u_3 * (g_1(f) - g_2(f))$ where $\alpha_i$ are the parameters to be optimized, and $c_{ij}$ are constants. If the optimization does not converge, up to 3 other starting points in parameter space are attempted. If no convergence point is found, ignore that scan. The form above uses the sine function to convert a constrained optimization into one that can be handled by an unconstrained optimization procedure. That is, the range of variation of the i, is constrained to $(-c^*_0+c^*_1, c^*_0+c^*_1)$. In the preferred implementation, $c^*_0=\{50,15,0.33,25\}$ and $c^*_1=\{55,16,0.68, 25.1\}$.

10. Each successfully converged optimization i yields a set of parameters $\alpha_i$ which in turn (with $c_{ij}$) constructs $SFR_i(f)$. Each fit also returns $\chi_i^2$ (low $\chi_i^2$ means a close fit) of the fit, i.e., the quality or closeness of the fit. Each $SFR_i(f)$ represents a candidate SFR for the system. To obtain the overall SFR estimate for the system, one could take the average or do cluster analysis in the 6-dimensional space represented by $(\alpha_1, \alpha_2, \alpha_3, \alpha_4, \chi_i^2, F_i)$. However, one can lower dimensionality by using an integrated measure of SFR instead. In a preferred embodiment, one uses subjective quality factor $$SQF_i = \frac{\int_0^\infty E(x) * SFR_i(x) d\log x}{\int_0^\infty E(x) d\log x}$$

where $E(x)$ is the eye contrast sensitivity function. Now use the 3 metrics for each $SFR_i(f)$ as a point $(\chi_i^2, SQF_i, F_i)) = (x_i, y_i, z_i)$ in parameter space and weight each fit to obtain a final system SFR estimate as a function of spatial frequency:

$$SFR(f) = \frac{\sum (z_i y_i^2 / x_i^2) * SFR_i(f)}{\sum (z_i y_i^2 / x_i^2)}$$

This metric weights high SQF's heavily (because one expects the true SFR to be represented by near maximum SQF's) and weights low $\chi_i^2$ heavily, to bias the metric toward scans which fit the model well. $\chi_i^2$ must be normalized by dpi (scanners) or pixel size (cameras) to make the centroid metric independent of sampling distance, and therefore comparable across devices.

In summary, the embodiments of the present invention described above provide a number of significant advantages. For instance, an advantage of the present invention is that it can be fully automatic—no human intervention is necessary. It can therefore be put to use when human involvement is too costly for whatever reason. A fully automatic approach may be augmented if the internal system models are inconsistent with the actual behavior of the physical systems in question.

In this case, a semi-automatic system is required whereby additional partial system knowledge such as system type is added by querying the user, the image header, or other available information.

Furthermore, an advantage of the present invention is that it provides an effective apparatus and method thereof for estimating the SFR characteristics of an image acquisition system, such as a scanner or camera, from its output images, when the original scene content cannot be carefully controlled as in the laboratory or conventional method.

In particular, the present invention can be applied under circumstances when feeding a know calibration target to the image acquisition system is not feasible. Plus, the present invention can be applied when the image acquisition systems are not available for characterization or they are too expensive to be characterized for whatever reason.

Moreover, the present invention SFR estimation apparatus and method thereof provide an efficient and cost-effective method for estimating the SFR of an image acquisition system or device.

Further yet, the present invention SFR estimation apparatus and method thereof provide the capability to take into account changes in SFR that may accrue during use of the image acquisition system or with system parameter setting adjustments.

Still further, the present invention SFR estimation apparatus and method thereof provide the capability to address intra-image differences in SFR due to depth-of-field related focus effects.

Finally, the present invention SFR estimation apparatus and method thereof avoid the need for having standard SFR information widely available in some standard "spatial profile" format.

The invention may be embodied in other specific forms without departing from the spirit or essential characteristics thereof The foregoing embodiments are therefore to be considered in all respects illustrative rather than limiting of the invention described herein. Scope of the invention is thus indicated by the appended claims rather than by the foregoing description, and all changes which come within the meaning and range of equivalency of the claims are therefore intended to be embraced herein.

I claim:

1. A method of estimating spatial frequency response (SFR) of a digital image acquisition system or device from the images that the system or device produces from input of an original scene, the estimating method comprising the following steps:

gathering, from the acquired image or images, data related to the SFR of the digital image acquisition system or device;

computing, from said gathered data, a collection of one or more SFR estimates which describe said gathered data, said computing step comprising:

grouping the gathered data into one or more data groups;

comparing each of said data groups with the response to an ideal (noise-free) signal passed through one or more predetermined system models;

selecting a system model for each of said data groups that best corresponds with each of said data groups; and computing an SFR estimate from said selected system model for each of said data groups; and generating, from said collection of SFR estimates and said gathered data, a single overall estimate of the SFR of the digital image acquisition system or device.

2. The method of claim 1, further comprising:

gathering additional information, from a source exclusive from said gathered data from the acquired image or images, wherein said additional information is related to the SFR of the digital image acquisition system or device.

3. The method of claim 1, further comprising:

providing predetermined default SFR information about the digital image acquisition system or device;

generating, from said gathered data related to the SFR and said single overall estimate of the SFR, replacement data for said predetermined default SFR information about the digital image acquisition system or device; and updating said predetermined default SFR information with said replacement data.

4. The method of claim 2, further comprising:

providing predetermined default SFR information about the digital image acquisition system or device;

generating, from said gathered data related to the SFR and said additional information related to the SFR and said single overall estimate of the SFR, replacement data for said predetermined default SFR information about the digital image acquisition system or device; and updating said predetermined default SFR information with said replacement data.

5. The method of claim 3, wherein providing said predetermined default SFR information of the digital image acquisition system or device comprises:

averaging SFR information from a plurality of image acquisition systems or devices.

6. The method of claim 4, wherein providing said predetermined default SFR information of the digital image acquisition system or device comprises:

averaging SFR information from a plurality of image acquisition systems devices.

7. The method of claim 2, wherein said additional information, exclusive from said gathered data from the acquired image or images, comprises:

image acquisition system type information, or information relating to compression, decompression, sharpening, focus, blurring, interpolation, resolution, dots-per-inch scanning, or color profiles.

8. The method of claim 1, wherein said acquired image or images comprise:

content information found in consumer photos, spatial calibration targets, or color calibration targets.

9. The method of claim 1, wherein gathering the data related to the SFR of the digital image acquisition system or device comprises:

finding system responses to step edges present in the original scene.

10. The method of claim 1, wherein gathering the data related to the SFR of the digital image acquisition system or device comprises:

finding system responses to lines, points, or corners present in the original scene.

11. The method of claim 2, wherein gathering the data related to the SFR of the digital image acquisition system device comprises:

finding system responses to step edges present in the original scene.

12. The method of claim 2, wherein gathering the data related to the SFR of the digital image acquisition system or device comprises:

finding system responses to lines, points, or corners present in the original scene.

13. The method of claim 2, wherein computing said collection of SFR estimates from the gathered data comprises the following steps:
grouping the gathered data into one or more data groups;
comparing each said data groups with the response to an ideal (noise-free) signal passed through one or more predetermined system models;
selecting a system model for each of said data groups that best corresponds with each of said data groups; and
computing an SFR estimate from said selected system model, for each of said data groups.

14. The method of claim 1, wherein said predetermined system models are represented by camera or scanner models.

15. The method of claim 13, wherein said predetermined system models are represented by camera or scanner models.

16. The method of claim 1, further comprising:
computing an overall system SFR estimate by combining said collection of SFR estimates.

17. The method of claim 16, wherein said method of combining said collection of SFR estimates further comprises:
computing a weighted average of said collection of SFR estimates.

18. The method of claim 17, wherein the weights of the weighted average are derived from an integrated SFR, a goodness metrics associated with said gathered data, and a goodness of fit of each of said data group associated with said SFR estimates.

19. The method of claim 18, wherein computing the weighted average comprises:
weighting higher values of said integrated SFR more heavily, relative to lower values of said integrated SFR.

20. The method of claim 18, wherein computing the weighted average involves weighting lower values of said goodness of fit of each of said data groups more heavily, relative to higher values of said goodness of fit.

21. The method of claim 18, wherein computing the weighted average comprises:
weighting higher values of said goodness metrics more heavily, relative to lower values of said goodness metrics.

22. The method of claim 1 wherein said generated overall SFR estimate is represented as Fourier domain values occurring at predetermined spatial frequencies.

23. An image processing system for estimating spatial frequency response (SFR) of a digital image acquisition system or device from the images that the digital acquisition system or device produces from input of an original scene, the image processing system comprising:
a means for gathering, from the acquired image or images, data related to the SFR of the digital image acquisition system or device:
a means for computing, from said gathered data, a collection of one or more SFR estimates which describe the gathered data, said computing means comprising:
means for grouping the gathered data into one or more data groups;
means for comparing each of said data groups with the response to an ideal (noise-free) signal passed through one or more predetermined system models;
means for selecting a system model for each of said data groups that best corresponds with each of said data groups; and
means for computing an SFR estimate from said selected system model for each of said data groups; and
a means for generating, from said collection of said SFR estimates and said gathered data, a single overall estimate of the SFR of the digital image acquisition system or device.

24. The system of claim 23, further comprising:
means for gathering additional information, from a source exclusive from said gathered data from the acquired image or images, wherein said additional information is related to the SFR of the digital image acquisition system or device.

25. The system of claim 23, further comprising:
means for providing predetermined default SFR information about the digital image acquisition system or device;
means for generating, from said gathered data related to the SFR and said single overall estimate of the SFR, replacement data for said predetermined default SFR information about the digital image acquisition system or device; and
means updating said predetermined default SFR information with said replacement data.

26. The system of claim 24, further comprising:
means for providing predetermined default SFR information about the digital image acquisition system or device;
means for generating, from said gathered data related to the SFR and said additional information related to the SFR and said single overall estimate of the SFR, replacement data for said predetermined default SFR information about the digital image acquisition system or device; and
means for updating said predetermined default SFR information with said replacement data.

27. The system of claim 24, wherein means for computing said collection of SFR estimates from the gathered data comprises the following steps:
means for grouping the gathered data into one or more data groups; means for comparing each said data groups with the response to an ideal (noise-free) signal passed through one or more predetermined system models;
means for selecting a system model for each of said data groups that best corresponds with each of said data groups; and
means for computing an SFR estimate from said selected system model, for each of said data groups.

28. The system of claim 23, further comprising:
means for computing an overall system SFR by combining said collection of SFR estimates.

29. The system of claim 28, wherein said means for combining said collection of SFR estimates further comprises:
means for computing a weighted average of said collection of SFR estimates.

30. The system of claim 23, wherein said generated overall SFR estimate is represented as Fourier domain values occurring at predetermined spatial frequencies.

* * * * *